(12) United States Patent
Huf

(10) Patent No.: US 6,193,785 B1
(45) Date of Patent: Feb. 27, 2001

(54) PROCESS FOR PROVIDING SUBJECTS WITH AN INCREASED OXYGEN SUPPLY

(76) Inventor: Hans Joachim Huf, Am Grossberg 36, D-55130 Mainz (DE)

( * ) Notice: Subject to any disclaimer, the term of this patent is extended or adjusted under 35 U.S.C. 154(b) by 0 days.

(21) Appl. No.: 09/051,794

(22) PCT Filed: Oct. 16, 1996

(86) PCT No.: PCT/DE96/01976

§ 371 Date: Jun. 29, 1998

§ 102(e) Date: Jun. 29, 1998

(87) PCT Pub. No.: WO97/15791

PCT Pub. Date: May 1, 1997

(30) Foreign Application Priority Data

Oct. 23, 1995 (DE) .............................. 195 39 314
Nov. 30, 1995 (DE) .............................. 195 44 680

(51) Int. Cl.⁷ ........................... B01D 53/22; B01D 53/26
(52) U.S. Cl. ...................... 95/54; 95/52; 95/139; 95/273; 96/10; 96/128; 96/130
(58) Field of Search .................. 95/54, 96–98, 95/100–105, 130; 96/4, 8, 10, 126–128, 130, 144; 55/385.1, 385.2, 385.3

(56) References Cited

U.S. PATENT DOCUMENTS

| | | | |
|---|---|---|---|
| 2,089,776 | * | 8/1937 | Wittmann ........................ 96/128 X |
| 3,230,033 | * | 1/1966 | Hamilton et al. ............. 55/385.2 X |
| 3,242,651 | * | 3/1966 | Arnoldi ............................... 96/127 |
| 3,369,343 | * | 2/1968 | Robb ............................. 55/385.2 X |
| 3,930,814 | * | 1/1976 | Gessner ........................... 95/54 X |
| 3,976,451 | * | 8/1976 | Blackmer et al. .................. 95/54 X |
| 4,007,875 | * | 2/1977 | Stolz et al. ................... 55/385.3 X |
| 4,681,602 | * | 7/1987 | Glenn et al. ........................ 96/4 X |
| 4,732,579 | * | 3/1988 | Veltman et al. ................ 96/128 X |
| 4,793,832 | * | 12/1988 | Veltman et al. ................ 96/128 X |
| 4,867,766 | * | 9/1989 | Campbell et al. .............. 96/130 X |
| 5,069,692 | * | 12/1991 | Grennan et al. ..................... 96/4 |
| 5,082,471 | * | 1/1992 | Athayde et al. ................. 95/54 X |
| 5,298,054 | * | 3/1994 | Malik ............................... 96/128 X |
| 5,429,662 | * | 7/1995 | Fillet .................................... 96/4 X |
| 5,470,379 | * | 11/1995 | Garrett .................................. 96/4 |
| 5,531,220 | * | 7/1996 | Cassidy ............................ 96/126 X |
| 5,643,355 | * | 7/1997 | Phillips et al. ......................... 96/4 |
| 5,649,995 | * | 7/1997 | Gast, Jr. ............................... 96/8 X |
| 5,665,143 | * | 9/1997 | Jarvis et al. ..................... 96/130 X |
| 5,833,726 | * | 11/1998 | Kinkead et al. ............... 55/385.2 X |

FOREIGN PATENT DOCUMENTS

| | | | | |
|---|---|---|---|---|
| 0294036 | * | 12/1988 | (EP) ..................................... 95/54 |
| 2122103 | * | 1/1984 | (GB) ...................................... 96/8 |
| 59-212632 | * | 12/1984 | (JP) ....................................... 96/4 |
| 4-156915 | * | 5/1992 | (JP) ....................................... 96/4 |

* cited by examiner

*Primary Examiner*—Robert H. Spitzer

(57) ABSTRACT

The invention relates to a process for providing subjects with an increased oxygen supply. Prior art processes, especially diaphragm or molecular sieve technology, are used to prepare oxygen-enriched pure air (10), which is used to flood premises in a building, an "oxygenarium". These premises are large enough for the subjects exposed to this atmosphere to have considerable freedom of movement, while at the same time it is possible for them to perform strengthening or rehabilitation exercises. The air consumed by the subjects is reprocessed and fed back into the oxygenarium with fresh outside air.

13 Claims, 2 Drawing Sheets

PROCESS FOR PROVIDING SUBJECTS WITH AN INCREASED OXYGEN SUPPLY

BACKGROUND OF THE INVENTION

1. Field of the Invention

The invention relates to a process for providing subjects with an increased supply of oxygen, and more particularly, to a process for providing oxygen enriched air to one or more spaces in a building.

It is known that human beings have been exposed in recent years to increasingly strong bioactive substances. A stress brought about by these substances becomes expressed by more frequent occurrence of allergies and other symptoms of illness. The substances are taken up via the skin by direct body contact, by eating and drinking, and also, to a considerable part, by breathing them in from the air. The health risks due to contaminated air in general, and the positive effect of pure, clean air, for example in air health resorts, will not be enlarged upon here, as this subject matter is generally assumed to be known and agreed upon.

All the functions of the body can proceed normally when sufficient oxygen ($O_2$) is made available to the body's cells ia the blood. The hemoglobin of the blood takes up oxygen from the respired air in the lungs. The better the oxygen uptake, the greater the fitness of the organism, and the better a human being feels. As an example of this there can be mentioned the altitude training of competitive athletes, which finally serves to make sufficient oxygen available to the cells of the body under greater stress.

2. Discussion of Relevant Art

It results from the composition of the atmospheric air that a person breathes in only 20% pure oxygen with each breath, and in contrast to this takes in nearly 80% of nitrogen ($N_2$), which is not used by the organism.

The recovery of oxygen from the air has been known for a long time. Thus in the so-called Linde process, the air is liquefied and then fractionally distilled, so that oxygen and nitrogen at about $-200°$ C. are obtained. Or oxygen is recovered chemically from barium oxide (BaO), or from carbon dioxide ($CO_2$), or by the electrolysis of water ($H_2O$).

In the middle 1980's, the hollow fiber membrane technology was developed, which makes it possible to separate the nitrogen relatively inexpensively from the air. Here the physical phenomenon is used that the different gases of the air diffuse at different speeds through a membrane. There are used as a membrane millions of bundled hollow fibers of the thickness of a human hair.

Molecular sieve technology is also known in which the air is introduced for oxygen enrichment alternately into two adsorption containers with artificial molecular sieves, which in an alternating process adsorb and desorb nitrogen and hydrocarbon.

Processes for providing a raised oxygen concentration are known and medically undisputed. Thus in acute illnesses oxygen is provided to the patients for breathing, for example by means of an oxygen tent or by flexible tube connections to the nose. Even patients who are not confined to bed are supplied with oxygen for therapeutic purposes. For this purpose, tubes which supply via a mask or directly to the nose are connected to small oxygen bottles which the patient carries. Trials were also carried out with oxygen pressure chambers in which the subjects had to spend a given time.

However, increasing their wellbeing by an increased oxygen supply was researched not only for sick people but also for healthy people. Thus there already are so-called oxygen bars worldwide, in which the guests, besides the usual offerings of bars, can also breathe oxygen in from a mask.

In most of the abovementioned processes of providing persons with an increased oxygen supply, the subject receives the oxygen for breathing in via a mask or directly through tube connections into the nose. This process is therefore very inconvenient for the subject and involves considerable cost and privations, and in particular because freedom of movement is greatly restricted while receiving oxygen.

SUMMARY OF THE INVENTION

The invention therefore has as its object to provide a cost-effective process by which there is insured the provision of an increased oxygen supply which is convenient to the subject, and at the same time the greatest possible freedom of movement and the possibility of carrying out exercises which increase performance and/or aid convalescence.

The invention solves this problem by means of a process for providing subjects with an increased supply of oxygen, comprising producing oxygen-enriched air, flooding one or more spaces with oxygen-enriched air, exposing subjects to an atmosphere containing the oxygen-enriched air in the spaces, and processing and using used air for producing the oxygen-enriched air.

For this, oxygen-enriched air is prepared and is used to flood spaces in which subjects are exposed to the atmosphere thus produced.

Thus the production of oxygen-enriched air can take place by means of membrane technology, in which compressed and heated air is forced through a membrane and the nitrogen is separated from the air.

It is an advantage that this system of hollow fiber membranes is absolutely maintenance-free, since it has no moving parts. Also, the yield and amounts of oxygen in this technology depend on the pressure and temperature used, and can thus be suited to the respective requirements. It is also advantageous that, due to the diffusion through the membrane, the oxygen-enriched air is absolutely dust-free and free from any germs.

In addition, the process is found to be cost-effective, since not only is the recovered oxygen used, but the nitrogen can also be used in other regions of utilization, e.g., as an inert or protective gas. This also correspondingly holds for the use of molecular sieve technology.

A further feature of the invention is that subjects who are exposed to this process can at the same time carry out exercises which increase performance and/or aid convalescence.

An advantageous development of the invention provides that air used by subjects can be processed again and used for the production of oxygen-enriched air, in order to make a cost-effective circulation available.

The oxygen-enriched air can furthermore be mixed with excited oxygen by irradiation with ultraviolet light of a wavelength which does not lead to the formation of ozone. It is known that excited oxygen is biologically more active than normal oxygen. The ultraviolet radiation can take place by means of radiators suspended below the ceiling of the space.

DESCRIPTION OF THE DRAWINGS

The invention is described in further detail hereinbelow by means of an preferred embodiments together with the drawings.

DETAILED DESCRIPTION OF PREFERRED EMBODIMENTS

Figure 1:
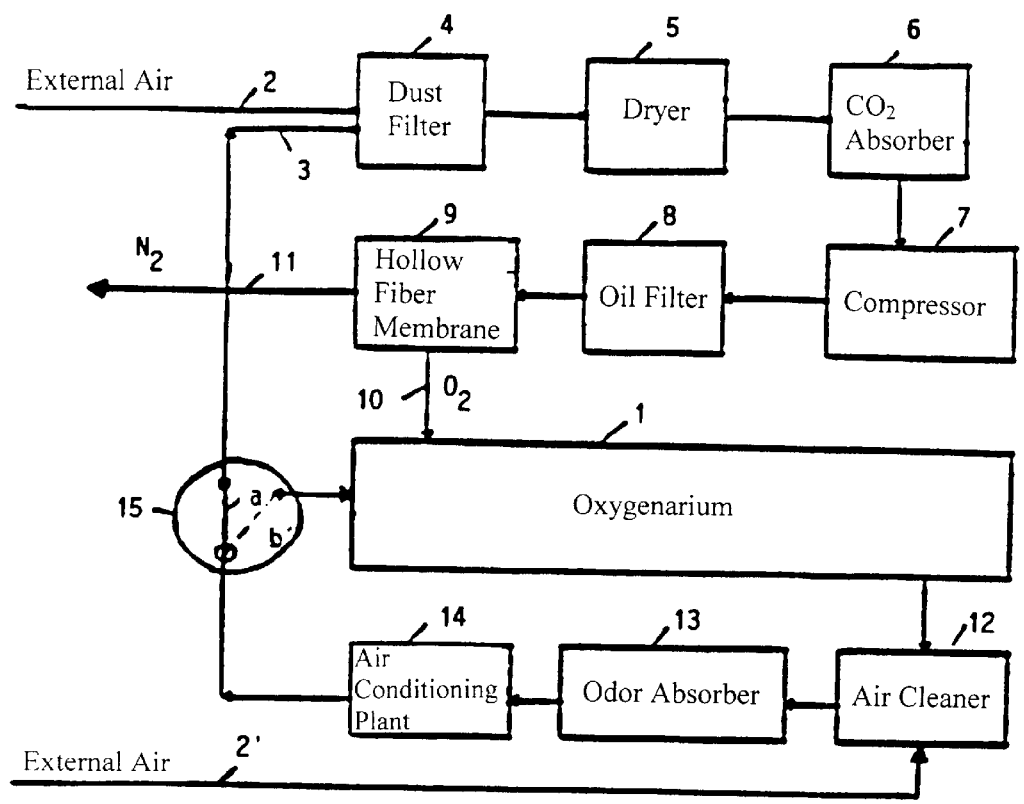
FIG. 1 shows a block diagram of the process according to the invention when using the hollow fiber membrane technology with a closed circuit.

Reference is made hereinafter to FIG. 1 in combination with FIG. 2; an embodiment example is shown of a circuit for the production of oxygen-enriched air 10 and to supply one or more spaces in a building 1, a so-called oxygenarium, with this air. For this purpose, the air, which is composed of atmospheric (2) and reprocessed (3) air, passes through a dust filter 4 which traps particles from the air. The pre-filtered air can be dried according to the desired air humidity by means of a drier 5 which is connected to the dust filter 4. Finally, the carbon dioxide can be removed from the air with an absorber 6 in a known manner. The yield and amount of oxygen after a diffusion through the hollow fiber membrane device 9 depends on the pressure and temperature used. The air therefore passes, before entering the membrane device 9, first into a compressor 7 and then an adjoining oil filter 8, in order not to undesirably load the membrane with oil from the compressor 7. Millions of bundled hollow fibers, each of the thickness of a human hair, serve as the membrane in the device 9. By the use of the physical phenomenon that different gases of the air diffuse through a membrane at different speeds, the air compressed in the compressor 7 is forced through the fibers of the membrane 9, and the quicker gases oxygen ($O_2$) and water vapor ($H_2O$ vapor) diffuse more rapidly through the membrane 9 than the relatively slow nitrogen ($N_2$) (carbon dioxide has already been removed from the air in the absorber 6).

Figure 2:
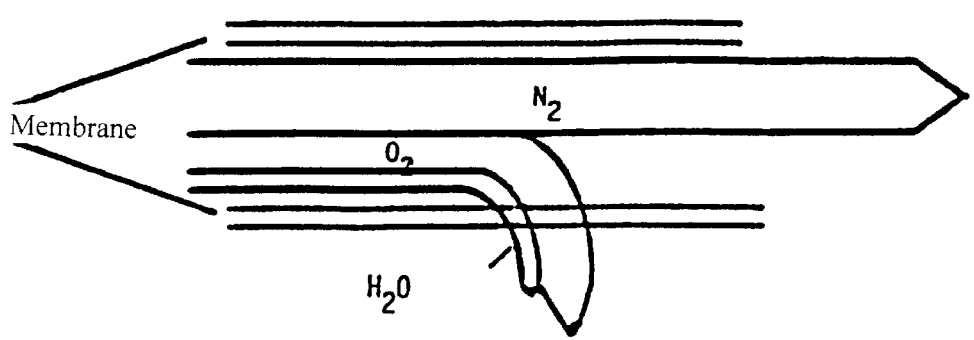
FIG. 2 shows schematically the principle of operation of the membrane technology.

This principle of action is shown schematically in FIG. 2. The system using the capillary technique has no moving parts and is therefore maintenance-free.

If the air is forced through the fibers of the membrane 9 at a pressure of 12 bar and a temperature of 20° C., about 40% oxygen is obtained in the so-called permeate, which is the end product of the membrane device 9. This oxygen-enriched air 10 is absolutely dust-free, and free from any germs, due to the diffusion through the membrane.

The nitrogen 11 which becomes available in this process can find application in other fields of use, e.g., as an inert gas for the fumigation of grain, or as a protective gas for gases which are susceptible to oxidation. In exactly the same way, oxygen is also produced in the known production of nitrogen by the process of the hollow fiber membrane technology, and in the reverse manner can be further used for the process according to the invention.

The oxygen production and concentration can be regulated by means of a changeover switch 15, which is shown as an electrical switch solely for elucidation, and in actuality consists of a valve which can be changed over.

In order to have to produce as little oxygen as possible and thus keep costs down with a less expensive membrane device 9, the changeover switch 15 is in switch position a, thus supplying to the oxygenarium 1 a portion of the used air, reprocessed by an air cleaner 12, an odor absorber 13, and an air conditioner 14, via the dust filter 4, with the formation of a circuit.

In order to counteract too high an oxygen enrichment in the oxygenarium 1, the changeover switch 15 is in switch position b, so that the air which has been reprocessed as hereinabove is supplied directly to the oxygenarium 1, bypassing the fiber membrane 9.

Unused exterior air 2' is supplied to the air cleaner 12, additionally to the used air from the oxygenarium. The air cleaner 12 must therefore be of very good quality, since the filtering action by the hollow fibers is lacking in the switch position b of the changeover switch. However, a corresponding filtering action can also be attained with an additional filter (not shown) between the changeover switch 15 and the oxygenarium 1.

Figure 3:
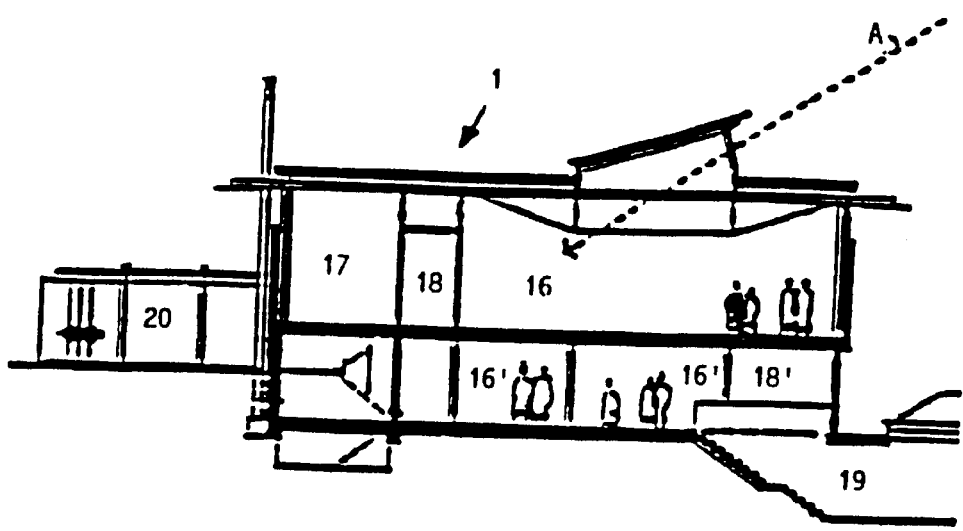
FIG. 3 shows the cross section of a building whose spaces can be flooded with oxygen-enriched air.
Figure 4:
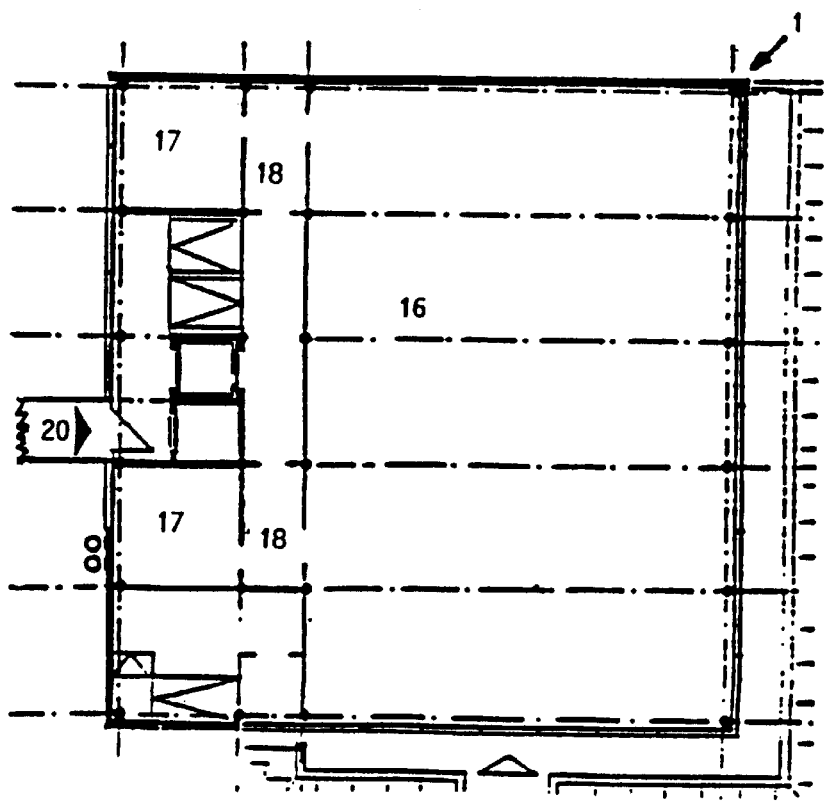
FIG. 4 shows the plan of the upper floor according to FIG. 3.

Spaces of the oxygenarium 1 are flooded with the oxygen-enriched air 10. FIGS. 3 and 4 respectively show a cross section and a plan view of the oxygenarium 1, in which a large hall 16 and possibly several smaller spaces 16' can be flooded with the clean, oxygen-enriched air. In the hall 16, which is flooded with light (arrow A) and is thus pleasantly bright, subjects of very varied indication groups, e.g. for hyperoxidation in lung diseases, in asthma, in allergies, after cancer treatment and the like, are exposed to this atmosphere; also, according to the purpose of application, exercises for increasing performance and/or for convalescence can at the same time be carried out. Such an oxygenarium 1 gives sufficient space for offering additional therapies and the associated care in further spaces 16'. However, the oxygenarium 1 can also serve to increase the wellbeing of healthy persons.

The technical devices according to FIG. 1 are installed in apparatus spaces 17 in the oxygenarium 1, but can also be set up in a space which is separate from the oxygenarium. This has the advantage that the technical equipment does not have to operate in the neighborhood of oxygen-enriched air and the associated increased risk of fire.

The hall 16, if necessary with its spaces 16', must be well sealed against exterior air in order to prevent losses of oxygen. Furthermore, a small excess pressure should be present in the oxygenarium, so that no foreign materials, including gases, can penetrate from outside. Access to the hall 16 is by means of locks 18 with at least two doors which can only be opened alternately, in order to prevent losses of oxygen and because of the excess pressure. Instead of this, a revolving door can also be used, with wall partitioning which prevents any direct connection between the outside and the inside. Several locks can of course be provided when further entrances are desired. For example, a further lock 18' can be built in as an antechamber of a tunnel 19 to another building, when the spaces 16' are also flooded with oxygen. However, the possibility also exists of flooding the whole building with oxygen. A lock (not shown) can then be provided in the entrance region 20.

Easily ignited and combustible parts are to be avoided in the oxygenarium as far as possible, and the oxygenarium is to be equipped in an ignition-retardant and flame-retardant manner.

In the process shown in FIG. 1, a PSA plant can be used instead of a hollow fiber membrane 9; the carbon dioxide absorber is then omitted. The compressed air is then alternately introduced into two adsorption containers. Artificial molecular sieves (zeolites) adsorb and desorb nitrogen and carbon dioxide in the pressure change process. Regeneration, and thus the desorption of the adsorbed gas mixture, takes place by alternate evacuation of the adsorption containers. The continuous inflow of oxygen into an oxygen reservoir insures the constant availability of concentrated oxygen with a purity of about 92 vol. %.

What is claimed is:

1. A process for providing subjects with an increased supply of oxygen for therapy, comprising:
   (a) producing oxygen-enriched air by hollow fiber membrane technology;
   (b) flooding one or more spaces with the oxygen-enriched air;
   (c) exposing subjects to an atmosphere containing the oxygen-enriched air in the spaces; and
   (d) processing and using used air for production of oxygen-enriched air.

2. The process according to claim 1, wherein said step of producing the oxygen-enriched air by membrane technology comprises forcing compressed or heated air through a hollow fiber membrane and separating nitrogen from the air.

3. The process according to claim 1, further comprising:
   (a) filtering the air to eliminate dust, insects and other foreign particles;
   (b) drying the filtered air, and removing carbon dioxide by absorption;
   (c) compressing the air in a compressor;
   (d) filtering the compressed air to eliminate oil residues coming from the compressor; and
   (e) conducting the oxygen-enriched air into one or more spaces.

4. The process according to claim 3, further comprising:
   (f) exhausting air from the space or spaces through an air cleaner; and
   (g) admixing external air to the exhausted air through an air cleaner.

5. The process according to claim 4, further comprising:
   (h) using air cleaned by means of an odor absorber and an air conditioning appliance in step (a) of claim 3.

6. The process according to claim 4, further comprising:
   (j) using air cleaned by means of an odor absorber and an air conditioning appliance in step (e) of claim 3.

7. The process according to claim 1, further comprising mixing the oxygen-enriched air with excited oxygen by means of irradiation with ultraviolet light of a wavelength that does not lead to formation of ozone.

8. Apparatus for supplying for therapy at least one space of a building with oxygen-enriched gas by carrying out a process according to claim 1, comprising:
   a device for producing oxygen-enriched air by hollow fiber membrane technology,
   a device for flooding the at least one space with the oxygen-enriched air, and
   a changeover switch, by means of which oxygen production and concentration can be controlled, in which a portion of used air is fed to the apparatus, forming a circuit.

9. The apparatus according to claim 8, in which the device for producing oxygen-enriched air by hollow fiber membrane technology includes a hollow fiber device for separating nitrogen from air.

10. The apparatus according to claim 8, further comprising a device for exhausting and reprocessing at least a portion of air from the at least one space.

11. The apparatus according to claim 10, in which the reprocessed air can be used for producing oxygen-enriched air.

12. The apparatus according to claim 10, in which the reprocessed air can be fed directly to the at least one space.

13. The apparatus according to claim 8, further comprising a device for mixing the oxygen-enriched air with excited oxygen.

* * * * *